(12) United States Patent
Arsenault

(10) Patent No.: US 8,848,280 B2
(45) Date of Patent: Sep. 30, 2014

(54) PHOTONIC CRYSTAL DEVICE WITH OFFSET ACTIVATION

(75) Inventor: Andre Arsenault, Toronto (CA)

(73) Assignee: Opalux Incorporated, Toronto (CA)

( * ) Notice: Subject to any disclaimer, the term of this patent is extended or adjusted under 35 U.S.C. 154(b) by 0 days.

(21) Appl. No.: 13/994,555

(22) PCT Filed: Dec. 14, 2011

(86) PCT No.: PCT/CA2011/001363
§ 371 (c)(1),
(2), (4) Date: Jun. 14, 2013

(87) PCT Pub. No.: WO2012/079152
PCT Pub. Date: Jun. 21, 2012

(65) Prior Publication Data
US 2013/0258445 A1    Oct. 3, 2013

Related U.S. Application Data

(60) Provisional application No. 61/422,694, filed on Dec. 14, 2010.

(51) Int. Cl.
*G02F 1/00* (2006.01)
*G02B 26/00* (2006.01)
*G02F 1/01* (2006.01)
*G02B 6/122* (2006.01)

(52) U.S. Cl.
CPC ............ *G02F 1/0131* (2013.01); *G02B 6/1225* (2013.01)
USPC ........... 359/322; 359/321; 359/290; 359/228; 359/237; 385/129

(58) Field of Classification Search
USPC ......... 359/290–295, 298, 228, 237, 238, 241, 359/245, 321, 322; 385/11, 15, 18, 37, 385/129–131; 428/320.1, 321.1
See application file for complete search history.

(56) References Cited

U.S. PATENT DOCUMENTS

| | | | | |
|---|---|---|---|---|
| 8,363,303 | B2 * | 1/2013 | Horning et al. | 359/290 |
| 8,548,283 | B2 * | 10/2013 | Kilic et al. | 385/12 |
| 8,676,016 | B2 * | 3/2014 | Arsenault et al. | 385/129 |
| 8,718,415 | B2 * | 5/2014 | Magnusson et al. | 385/11 |
| 2004/0008934 | A1 | 1/2004 | Takiguchi et al. | 385/27 |

OTHER PUBLICATIONS

International Preliminary Report on Patentability dated Jun. 18, 2013, for International Patent Application No. PCT/CA2011/001363.
International Search Report dated Mar. 20, 2012, for International Patent Application No. PCT/CA2011/001363.
Lee, et al., "Design an Modeling of a Nanomechanical Sensor Using Silicon Photonic Crystals" Journal of Lightwave Technology, vol. 1, No. 7; pp. 839-846, Apr. 1, 2008.

* cited by examiner

*Primary Examiner* — Loha Ben
(74) *Attorney, Agent, or Firm* — Fulbright & Jaworski LLP

(57) ABSTRACT

A photonic crystal device including a photonic crystal material and an activation surface. The photonic crystal material exhibits a first reflectance spectrum in an unactivated state, and, in response to mechanical stimulation, exhibits a second reflectance spectrum in an activated state. Application of a force at an activation portion of the activation surface offset from a material-supporting portion of the activation surface causes a deformation of the photonic crystal material sufficient to bring the photonic crystal material to the activated state.

19 Claims, 12 Drawing Sheets

Figure 2

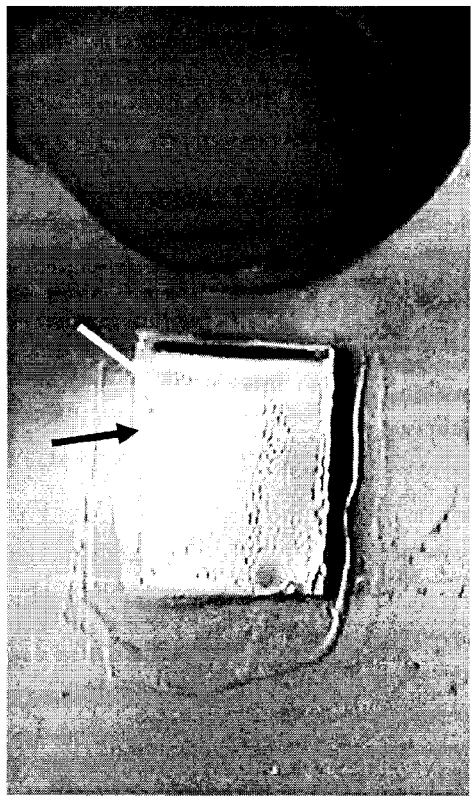
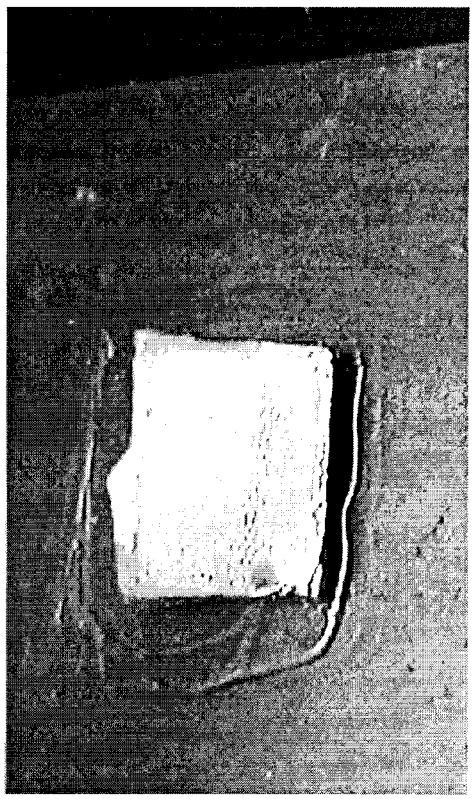
Figure 11

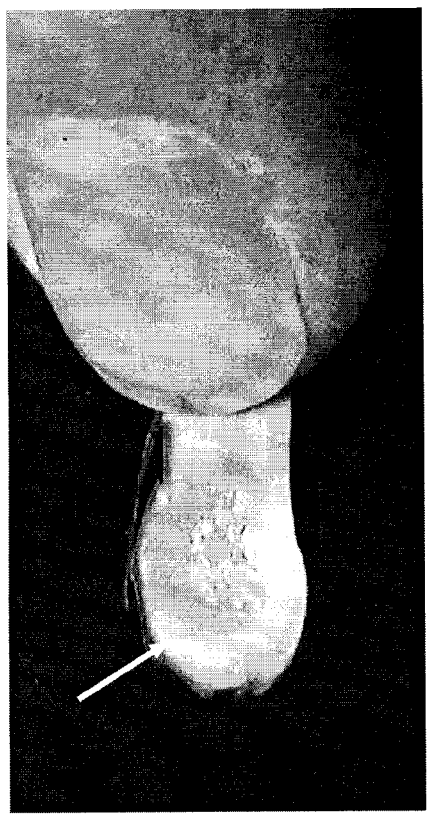
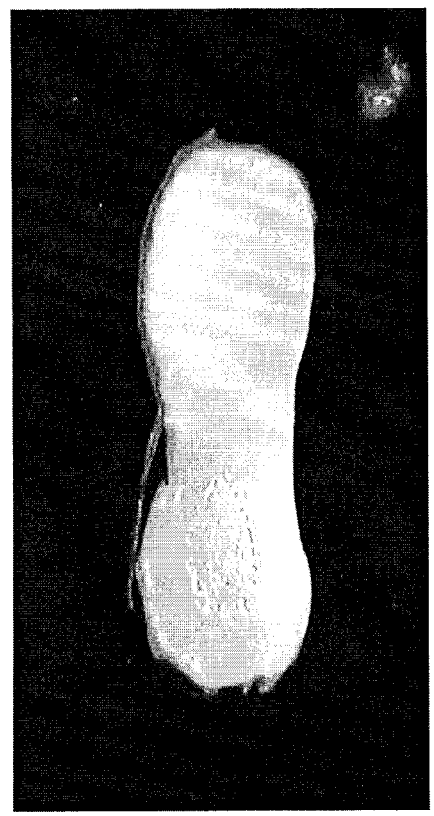
Activated
Unactivated
Figure 12

PHOTONIC CRYSTAL DEVICE WITH OFFSET ACTIVATION

CROSS-REFERENCE TO RELATED APPLICATIONS

This application is a national phase application under 35 U.S.C. §371 of International Application No. PCT/CA2011/001363, which claims priority from U.S. provisional patent application No. 61/422,694, filed Dec. 14, 2010. The entire contents of each of the above-referenced disclosures is specifically incorporated herein by reference without disclaimer.

TECHNICAL FIELD

The present disclosure relates to a photonic crystal-based device. In particular, the present disclosure relates to a photonic device incorporating a deformable photonic crystal material, wherein the deformation of the photonic crystal occurs due to the application of an indirect or offset activation force. Deformation of the photonic crystal material may give rise to a change in an optical effect of the device.

BACKGROUND

Photonic crystals (PCs) are materials having structure that includes a periodic modulation in their refractive index (Yablonovitch, Phys. Rev. Lett., 58:2059, 1987), giving rise to a photonic band gap or stop gap, in which electromagnetic waves within a certain stop band wavelength range may be mostly or totally reflected. The wavelengths of the stop band may be dependent on the distance between the periodic modulations in the crystal. The reflected stop band wavelengths may appear in the reflectance spectrum as a reflectance peak known as a Bragg peak. A photonic crystal may have a one-, two-, or three-dimensional periodic structure.

Slight changes in the refractive index and/or structure of a photonic crystal material may result in optically detectable changes in the reflectance spectrum. Controlled changes to the reflectance spectrum may be referred to as "tuning." This may be useful where the reflected light is in the visible range, for example allowing for detectable changes in color if the refractive index and/or lattice spacing is modulated. In some examples, mechanically deformable materials, such as polymers, may be incorporated into photonic crystal materials, such that the PC may be made responsive to mechanical stimulation, such as compression or stretching. Examples of such an application may be found in PCT Publication No. WO2008/098339, and in PCT Publication No. WO2006/097173, which are herein incorporated by reference in their entireties.

FIG. 1 illustrates some examples of how a mechanically deformable photonic crystal material may be deformed to change its lattice constant along at least one direction. In this example, the photonic crystal material may have an inverse opal structure, including a plurality of ordered voids in a deformable polymer matrix. Similar principles may apply to materials having periodicity in only 2 or 1 dimension, such as for hollow rods in a polymer slab, or for a material consisting of alternating planar layers (which may be also referred to as a Bragg Stack). As shown, an example mechanically deformable photonic crystal material may be stretched or compressed along one of its dimensions (i.e., height, width or length). Such mechanical deformation may cause a change in the lattice structure of the material, resulting in a change in the reflectance spectrum of the material. In some examples, such mechanical deformation may be at least partially reversible and/or repeatable.

SUMMARY

The present disclosure provides examples of photonic crystal devices where the mechanical deformation of a photonic crystal material may be driven not by directly deforming the photonic crystal material (e.g., by directly pressing with a finger or directly stretching a piece of the photonic crystal material), but rather is through an indirect or offset activation.

In some example aspects, the present disclosure describes examples of a device based on a mechanically deformable photonic crystal material, such as a porous photonic crystal material. The device may include a photonic crystal material that may display an initial characteristic optical effect (e.g., an initial reflected wavelength range). The device may also include one or more mechanical elements coupled to the photonic crystal material that may allow an indirect or offset activation force to be transmitted to the photonic crystal material. The subjection of the mechanical element to a mechanical force may cause the mechanical element to transfer all or some of this mechanical force to the photonic crystal material, thereby deforming the photonic crystal material, and the deformation of the photonic crystal material may cause a change from the initial optical effect to a second different optical effect (e.g., a different reflected wavelength range).

In some examples, the device may be responsive to the amount of mechanical force applied, such that the photonic crystal device may exhibit a plurality of optical effects intermediate to the first and second optical effect. Examples of the disclosed devices may be useful as features for security, anti-counterfeit, tamper-proofing, brand security, decoration, and marketing in various products, packaging, cards, consumables, pharmaceuticals, and secure documents, among other applications.

In some aspects of the disclosure, there is provided a photonic crystal device comprising: a photonic crystal material exhibiting a first reflectance spectrum in an unactivated state, the photonic crystal material having an activated state in response to at least mechanical stimulation and exhibiting a second reflectance spectrum different from the first reflectance spectrum in the activated state; an activation surface having a material-supporting portion directly coupled to at least a portion of the photonic crystal material; and an activation portion defined on the activation surface offset from the material-supporting portion; wherein application of a force at the activation portion causes a deformation of the photonic crystal material sufficient to bring the photonic crystal material to the activated state.

In some examples, the photonic crystal material may be provided on a substrate. For example, the substrate may be coupled to the activation surface via a pivot, and the activation surface may be sufficiently rigid to transfer force applied at the activation portion to the photonic crystal material by way of a lever mechanism. In some examples, the activation portion and the material-supporting portion may be on either sides of the pivot, forming a class one lever. In some examples, the activation portion and the material-supporting portion may be both on one side of the pivot, the activation portion being farther from the pivot than the material-supporting portion, forming a class two lever. In some examples, the activation portion and the material-supporting portion may be both on one side of the pivot, the activation portion being closer to the pivot than the material-supporting portion, forming a class three lever.

In some examples, the pivot may be provided by a portion of the photonic crystal material that is less deformable than at least one other portion of the photonic crystal material. In some examples, the pivot may be provided by a portion of the photonic crystal material which is itself deformed but which provides sufficient mechanical structure and/or rigidity to function as a pivot.

In some examples, the device may include a fluid-filled chamber, the activation surface being provided on at least one outer surface of the fluid-filled chamber, wherein deformation of the activation portion causes a corresponding deformation of the material-supporting portion.

In some examples, deformation of the activation portion may cause a transfer of fluid to cause the corresponding deformation of the material-supporting portion. This fluid may be a gas or vapor, such as air, or a liquid or semi-liquid. The chamber may be substantially sealed, or could be open, with the chamber configuration affecting the amount of pressure transferred by the fluid. The chamber may include a valve to mediate the amount of fluid pressure in the chamber and/or mediate the kinetics of fluid transfer, and/or mediate the rate at which pressure in the chamber will change following activation. For example, the chamber may include two or more cavities in fluid communication with each other, and the valve may be provided in a fluid path between the two cavities to mediate transfer of fluid between the two cavities.

In some examples, the photonic crystal material may be provided on a substrate, in a space defined between the substrate and the activation surface, and application of the force at the activation portion may decrease the space, thereby causing deformation of the photonic crystal material. In some examples, the activation surface and the substrate may be biased apart in the unactivated state.

In some examples, the force may be a compression force or a bending force.

In some examples, only a portion of the photonic crystal material immediately surrounding the portion directly coupled to the activation surface at the material-supporting portion may be deformed. For example, the coupled portion of the photonic crystal material may include data content.

In some examples, deformation of the photonic crystal material may be unequal over the photonic crystal material.

In some examples, the photonic crystal material may be provided on a substrate and the substrate may be coupled to the activation surface via a pulley wheel. The activation surface may be supported by the pulley wheel and may be sufficiently flexible to at least partially hang below where it is supported by the pulley wheel. Before application of the activation force, the material-supporting portion may be loose. The material-supporting portion and the activation portion may be on opposing sides of the pulley wheel. When force is applied to the activation portion, the material-supporting portion may be pulled more taut, thereby causing a stretching of the photonic crystal material.

BRIEF DESCRIPTION OF THE DRAWINGS

FIG. 11 shows images of an example device, similar to that of FIG. 4, in operation; and FIG. 12 shows images of an example device having activation via fluid transfer in operation.

DETAILED DESCRIPTION

Figure 1:
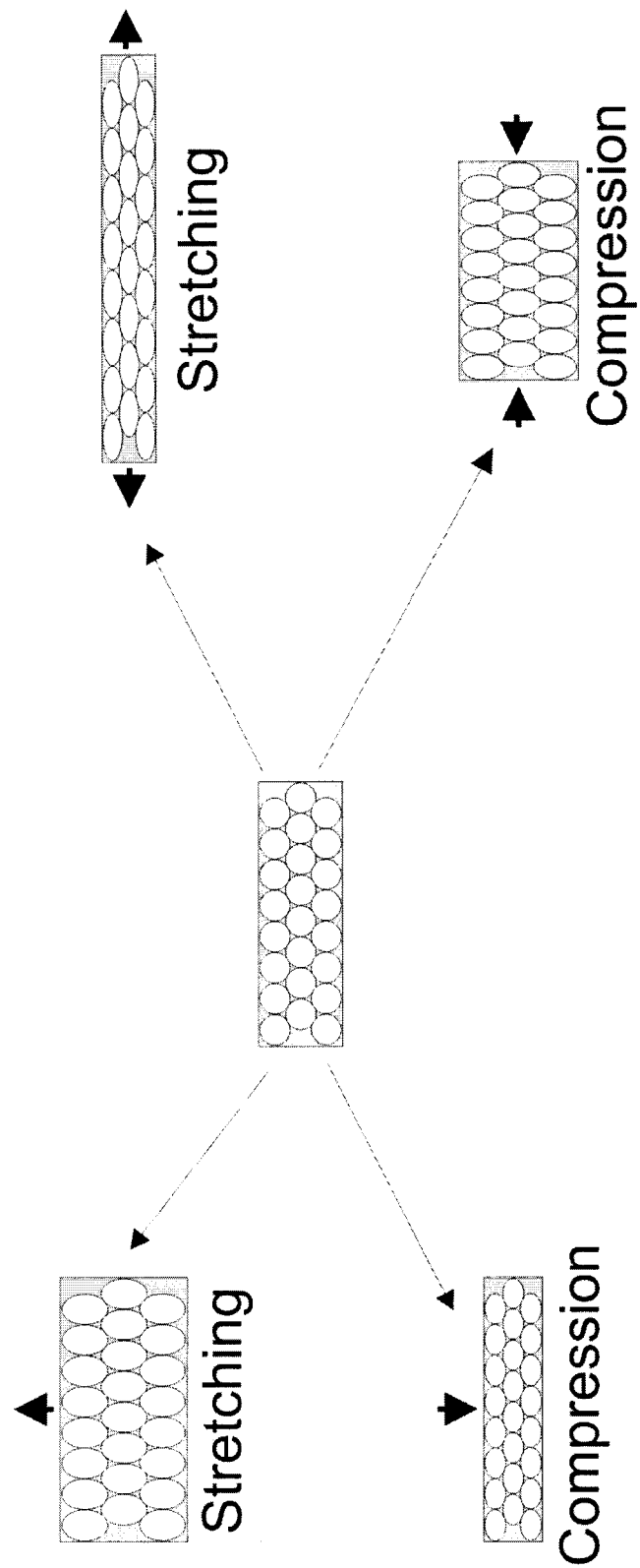
FIG. 1 illustrates different deformations of an example photonic crystal material that may be suitable for use in a photonic crystal device with offset activation, in accordance with some embodiments of the disclosure.

FIG. 1 shows some examples of how deformable photonic crystal materials may be deformed to generate a change in lattice spacing in at least one direction. Such a change may give rise to detectable changes in the optical effects (e.g., reflection spectra) of the photonic crystal materials.

Such photonic crystal materials may be activated or deformed by the direct application of a force (e.g., compression, stretching, shearing, bending, etc.). For example, a user may press down on such a material with a finger. However, the direct application of the force may obscure the deformed portion of the material, making the change in the optical effect not visible to the user. For example, when a user presses down on the material with a finger, the portion of the material under the finger may exhibit a detectable change in its reflectance spectrum, but this change is obscured from the user's sight by the user's own finger. When the finger is removed, the material may quickly revert back to its undeformed state and its original reflectance spectrum, such that the user is provided with relatively little time to notice any change in the reflectance spectrum.

It may be useful to provide a photonic crystal device in which activation of the photonic crystal material is indirect or offset from the material itself, which may help to avoid the problem of obscuring the view of the user, as described above.

Such a device may also provide a response distinguishable from devices incorporating thermochromic materials, which change in optical effect in response to heat, for example heat from a user's finger touching the material. In some cases, a compressible photonic crystal material directly compressed by a user's finger may exhibit a change in optical effect that may be difficult to distinguish from that of a thermochromic material which may be activated by the heat coming from direct contact with a user's finger. It may be useful to provide a photonic crystal device in which activation of the photonic crystal material is indirect or offset from the material itself, which may help to provide a greater differentiation with respect to thermochromic devices.

FIGS. 2 to 10 show example embodiments of the photonic crystal device. Generally, the photonic crystal device may include a photonic crystal material 10 and an activation surface 20. The photonic crystal material 10 may be response to at least mechanical stimulation. For example, the photonic crystal material 10 may be mechanically deformable. The photonic crystal material 10 may have an unactivated state in which it exhibits a first reflectance spectrum, and an activated state in which it exhibits a second reflectance spectrum that is different from the first reflectance spectrum. This difference may be optically detectable, such that activation of the photonic crystal material 10 may cause a detectable change in an optical effect (e.g., change in color, transparency, etc.) of the photonic crystal device. The change in the optical effect may be detectable within the visible spectrum (e.g., change from one color to another color, change from transparent to colored, or change from colored to transparent), or may be detectable in non-visible spectra (e.g., in the infrared or ultraviolet spectra) with the aid of suitable detection equipment.

At least a portion of the photonic crystal material 10 may be coupled to the activation surface at a material-supporting portion 22 of the activation surface 20. The photonic crystal material 10 may be coupled to the activation surface 20 at the material-supporting portion 22 using, for example, an adhesive.

Examples of suitable adhesives may include various available adhesives, including, for example: epoxy adhesives, polyurethane adhesives, lamination adhesives, pressure-sensitive adhesives, heat-curable adhesives, dual-cure adhesives, thermoplastic adhesives (hot-melt), reactive hot-melt adhesives, moisture-cure adhesives, 2-part adhesives, foam adhesives, spray adhesives, instant adhesives, UV-cure adhesives, acrylic adhesives, thermally or electrically conductive adhesives, silicone adhesives, and water-based adhesives. Extensive listings of these and other possible adhesives can be found on catalogues by 3M (www.mmm.com) or Ellsworth Adhesives (www.ellsworth.com), for example.

An activation portion 24 may be defined on the activation surface 20 offset or remotely from the material-supporting portion 22. Application of a force F at the activation portion may cause deformation of at least a portion of the photonic crystal material 10. Such deformation (e.g., compression or stretching) may be sufficient to cause the photonic crystal material 10 to exhibit a change from its unactivated state to its activated state, resulting in a change in the optical effect of the photonic crystal device.

In some examples, the device may be designed to be activated by a manual force (e.g., pressing by a finger of a user or gripped by a user). In other examples, the device may be designed to be activated by a moderate impact force (e.g., impact of a human landing from a jump or impact of a bat hitting a baseball). In yet other examples, the device may be designed to be activated by a much greater force (e.g., impact of a vehicle collision). As such, the device may be designed to be activated by any suitable range of forces, for example from 0.0001N or less to 100,000N or more. For example, average grip strength of a human male may be in the range of about 500-600N, and a device designed to be activated by manual gripping may be designed to be activated by a force F of at least 500N. Similarly, the impact of a baseball on a bat may be about 18,000N and a device designed to be activated by impact of a baseball on a bat may be designed to be activated by a force F of at least 15,000N.

The amount of optical change exhibited by the device may be directly related to the amount of deformation of the photonic crystal material 10, which may in turn be directly related to the amount of force F applied on the device. As such, the device may be designed to be activated by a range of forces, and the optical change exhibited in response to the applied force F may indicate the amount of force F applied. For example, a device designed to test the gripping force of a user may exhibit a slight optical change when lightly gripped (e.g., a shift from blue in the unactivated state to green when gripped) and may exhibit a greater optical change when strongly gripped (e.g., a shift from blue in the unactivated state to red when gripped).

In some examples, the deformation of the photonic crystal material 10 to its activated state may be instantaneous or nearly instantaneous upon application of the force F, or may be delayed upon application of the force F. Upon release of the force F from the device, the photonic crystal material 10 may revert fully or partially back to its unactivated state (and thus revert fully or partially back to its first reflectance spectrum), and this reversion may follow a relaxation rate that may be preconfigured or predetermined for the photonic crystal material 10. In some examples, the photonic crystal material 10 may be permanently or semi-permanently deformed due to application of the force F, such that removal of the force F from the device does not revert the optical effect of the photonic crystal device back to its initial state, or reverts only partially, resulting in an intermediate optical effect that is effect different from the initial optical effect.

In some examples, the photonic crystal material 10 may be provided on a substrate 30. The substrate 30 may serve to help improve the robustness of the photonic crystal device (e.g., by increasing the rigidity of the photonic crystal device), may help to facilitate manufacture of the photonic crystal device (e.g., by providing a surface on which the photonic crystal material 10 may be formed or transferred) and/or may play a role in causing the deformation of the photonic crystal material 10. The substrate 30 may be provided to support a surface of the photonic crystal material 10 that is opposite to a surface of the photonic crystal material 10 that is coupled to the activation surface 20. The photonic crystal material 10 may be coupled to the substrate 30, for example using an adhesive or by way of intermolecular bonds, or the photonic crystal material 10 may be free-floating on the substrate 30. The substrate 30 may be made of any suitable material including, for example, glass, ceramic, metal, polymer or a mix thereof. The substrate 30 may be selected to provide a suitable amount of rigidity and/or optical transparency, for example.

Where the device includes the substrate 30, at least one of the substrate 30 and the activation surface 20 may be at least partly transmissive to at least certain wavelengths of light, or may have provided apertures to view at least a portion of the photonic crystal material 10, to allow for optical detection of a change in the reflectance spectrum of the photonic crystal material 10. For example, at least a portion of the activation surface 20 that is over the photonic crystal material 10 may be transparent, translucent or at least transmissive to wavelengths of light corresponding to the first, second or both reflectance spectra of the photonic crystal material.

Figure 2:
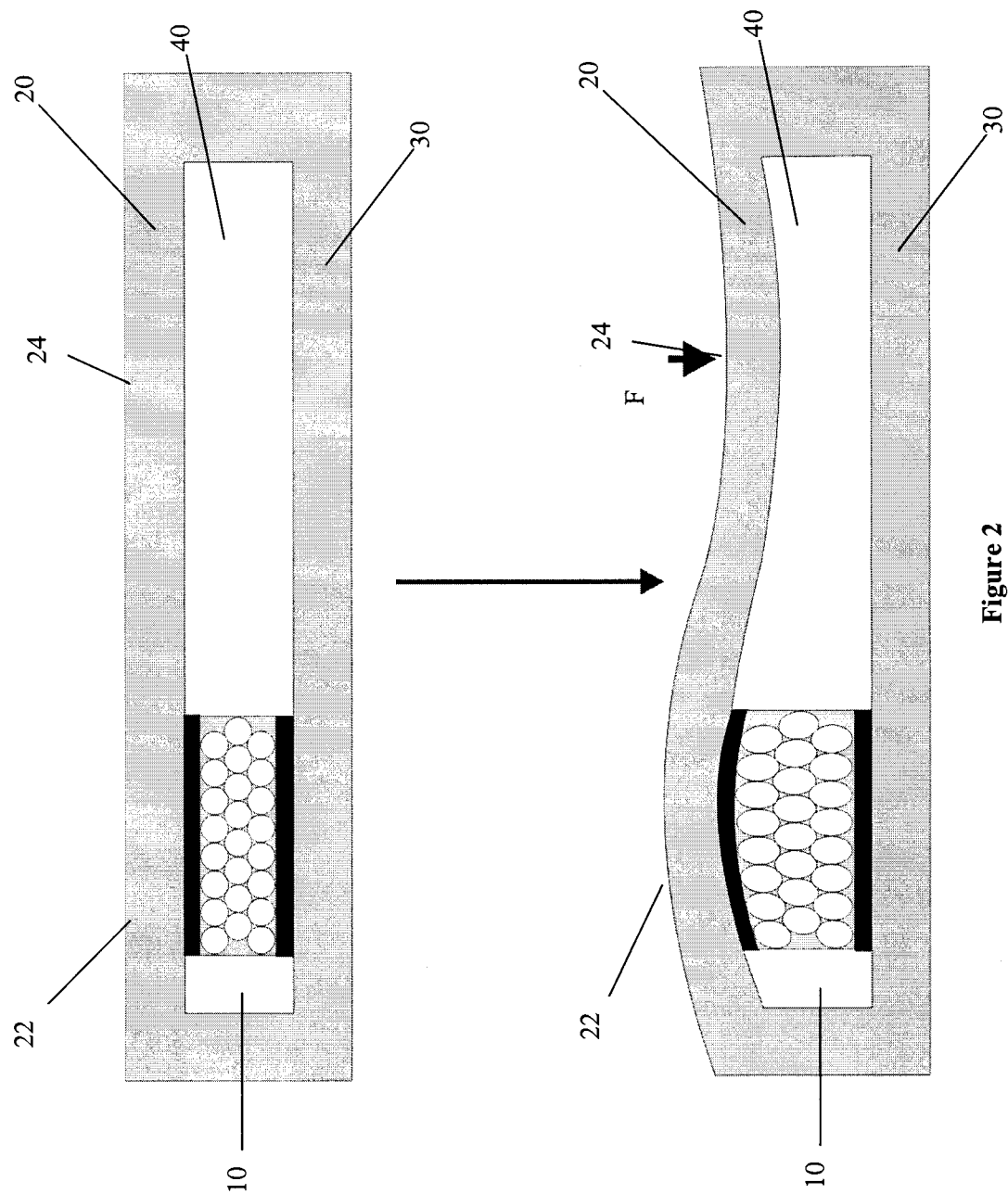
FIG. 2 illustrates an example device, utilizing the transfer of fluid pressure to enable offset activation.

FIG. 2 shows an example photonic crystal device including a fluid-filled chamber 40. In such an embodiment, the deformation of the photonic crystal material 10 may be mediated by transfer of fluid pressure. Such a device may incorporate a sealed or semi-sealed fluid-filled chamber 40 containing a fluid such as a gas (e.g., air, nitrogen, noble gases, carbon dioxide or any other suitable gas), a liquid (e.g., water, oil, organic or inorganic solvent, liquid polymer or any other suitable liquid), a paste (e.g., a semi-solid polymer), or a gel (e.g., a dispersion). In this example, the device may be provided in film form, with the fluid-filled chamber 40 being provided between the activation surface 20 and the substrate 30, which may be relatively flat when the device is unactivated.

Activation of the device may be by way of a compressive force F applied (e.g., manually, such as by a user's finger) at the activation portion 24. Application of the force F may cause the fluid in the fluid-filled chamber 40 to be displaced to an uncompressed region of the fluid-filled chamber 40. This fluid displacement may cause the material-supporting portion 22 to be stretched (e.g., due to an increase in pressure), causing deformation (e.g., stretching) of the photonic crystal material 10. This deformation of the photonic crystal material 10 may result in a change in its lattice spacing in at least the stretched dimension, resulting in a change to the second reflectance spectrum and an optically detectable change in the overall optical effect of the device.

Figure 3:
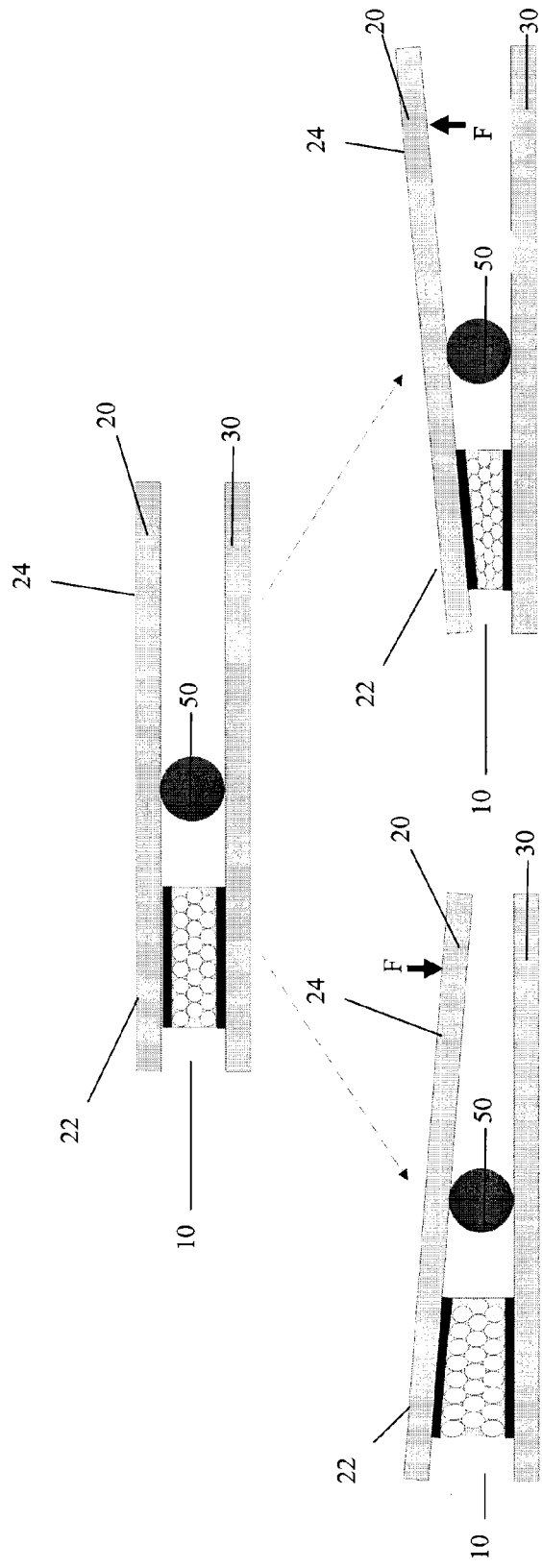
FIG. 3 illustrates an example device utilizing a hinge element as mechanical device to enable offset activation.

FIG. 3 shows an example photonic crystal device wherein the deformation of the photonic crystal material 10 may be mediated by a lever mechanism. In this example, the photonic crystal material 10 may be provided on the substrate 30. A pivot 50 (e.g., a hinge) may be used to couple the substrate 30 to the activation surface 20. This pivot 50 may be any suitable shape (e.g., sphere, cylinder, or any regular or irregular shape), size and thickness, and may be a separate element (e.g., as shown in FIG. 3) or may be a single point or line of attachment between the activation surface 20 and the substrate 30. The activation surface 20 (and the substrate 30, where applicable) may be sufficiently rigid (e.g., made of glass, ceramic or metal, or made of a rigid or semi-rigid polymer such as polystyrene, polymethylmethacrylate, or polycarbonate) such that force F applied at the activation portion 24 may be transferred to the photonic crystal material 10 by way of a lever mechanism, causing a deformation of the photonic crystal material 10. The rigidity or flexibility of the activation surface 20 (and the substrate 30, where applicable) may affect fraction of the force F transferred to the photonic crystal material 10 and the lateral distance over which the mechanical force F would have an effect on the photonic crystal material 10. For example, where the activation surface 20 (and the substrate 30, where applicable) is less rigid (e.g., made of polyethylene instead of polycarbonate, or using a thinner gauge of an otherwise more rigid material, such as using a polymethylmethacrylate material having a thickness of a few millimeters down to about 10-100 micrometers, to give a more pliable substrate), only a portion of the photonic crystal material 10 close to the pivot 50 may be activated.

In the example of FIG. 3, the activation portion 24 and the material-supporting portion 22 are on either sides of the pivot 50, such that application of a force F at the activation portion 24 causes the photonic crystal device to act as a class one lever, thereby deforming the photonic crystal material 10. In this example, both the substrate 30 and the activation surface 20 are coupled to the photonic crystal material 10, such that both a downward force F (as in the bottom left figure) and an upward force F (as in the bottom right figure) may be used to activate the device. For example, a downward force F at the activation portion 24 may result in stretching of the photonic crystal material 10 in a direction substantially or approximately perpendicular to the substrate 30, increasing the lattice constant of the photonic crystal material 10, which may result in a longer wavelength of peak reflectance. Conversely, an upward force F at the activation portion 24 may result in compression of the photonic crystal material 10 in a direction substantially or approximately perpendicular to the substrate 30, decreasing the lattice constant of the photonic crystal material 10, which may result in a shorted wavelength of peak reflectance. In other examples, the photonic crystal material 10 may be unattached to the substrate 30 and/or the activation surface 20, such that a downward force F at the activation portion would not activate the device.

Figure 4:
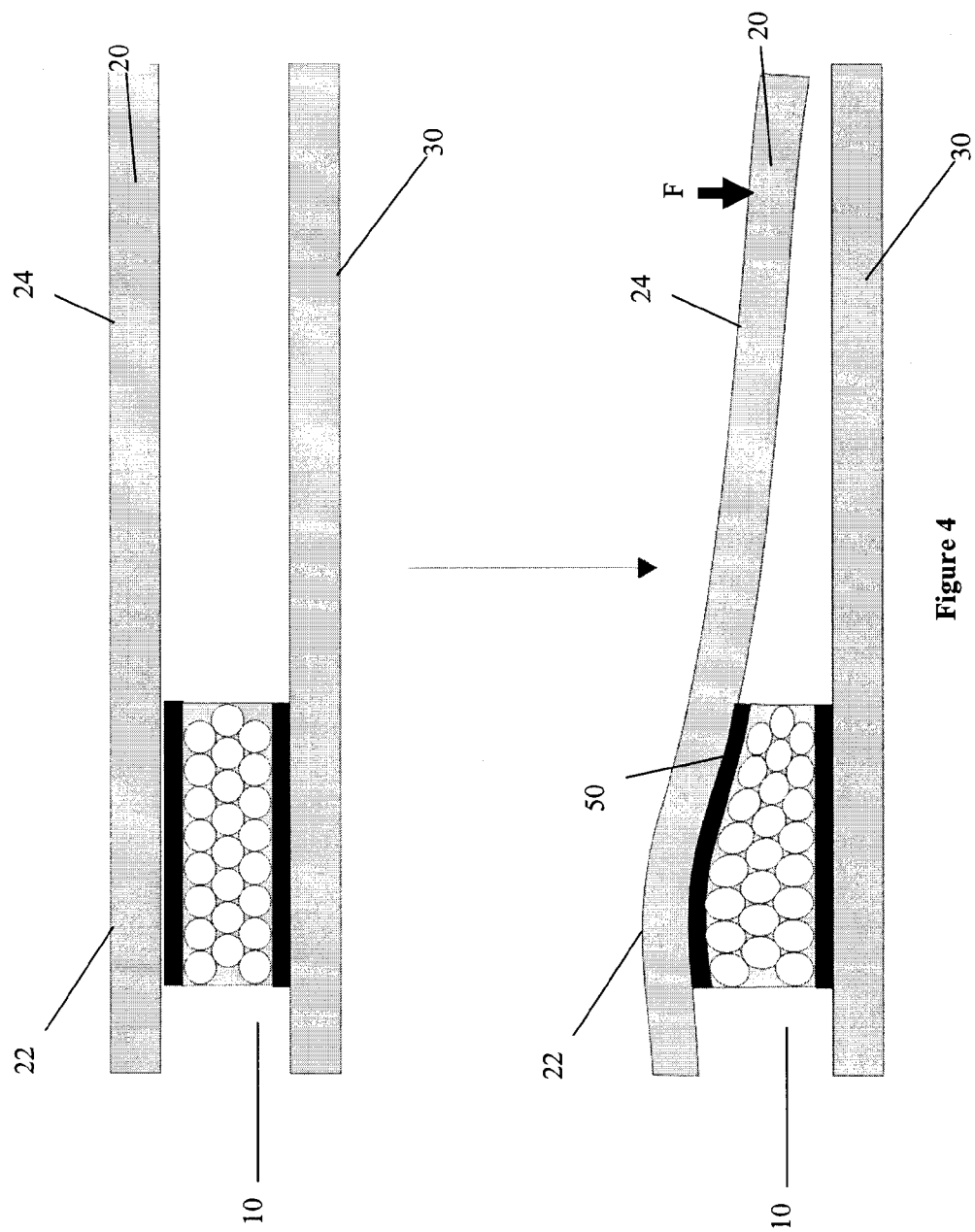
FIG. 4 illustrates an example device having hinge structure, where the hinge element is the edge of the photonic crystal material itself.

FIG. 4 shows an example device in which the photonic crystal material 10 may be provided between the activation surface 20 and the substrate 30, such that the photonic crystal material 10 serves to space apart the activation surface 20 and the substrate 30. A compressive force F applied at the activation portion 24, offset from the photonic crystal material 10, may cause respective portions of the activation surface 20 and the substrate 30 to be brought closer to each other, resulting in a compression of at least a portion of the photonic crystal material, thus resulting in a change to the second reflectance spectrum (e.g., shift to shorter wavelengths) and a change in the overall optical effect of the device.

Where the photonic crystal material 10 is sufficiently compressible and the activation surface 20 and the substrate 30 are sufficiently rigid, the entire photonic crystal material 10 may be compressed. Where the photonic crystal material 10 is less compressible, and/or where the activation surface 20 and/or the substrate 30 are less rigid, only a portion of the photonic crystal material 10 may be compressed. In some examples, depending on the geometry and/or compressibility of the photonic crystal material 10, the edge of the photonic crystal material 10 may serve as the pivot 50, such that while the edge may be compressed, a different portion of the photonic crystal material 10 may be stretched. This may result in a portion of the photonic crystal material 10 shifting to a second reflectance spectrum (e.g., shift to shorter wavelengths in the compressed portion) while another portion of the photonic crystal material 10 shifts to a third reflectance spectrum (e.g., shift to longer wavelengths in the stretched portion).

For example, at the edge of the photonic crystal material 10, the applied force F may be sufficient to partially or completely collapse the void structure of the photonic crystal material 10, resulting in this edge portion of the photonic crystal material 10 being substantially non-porous and therefore having increased density and stiffness. The collapsed edge portion having greater density and stiffness than the remaining portion of the photonic crystal material 10 may then serve as the pivot 50. Any force above that required to collapse this edge portion of the photonic crystal material 10 may then act as a lever force, thus stretching the remaining portion of the photonic crystal material 10.

Figure 5:
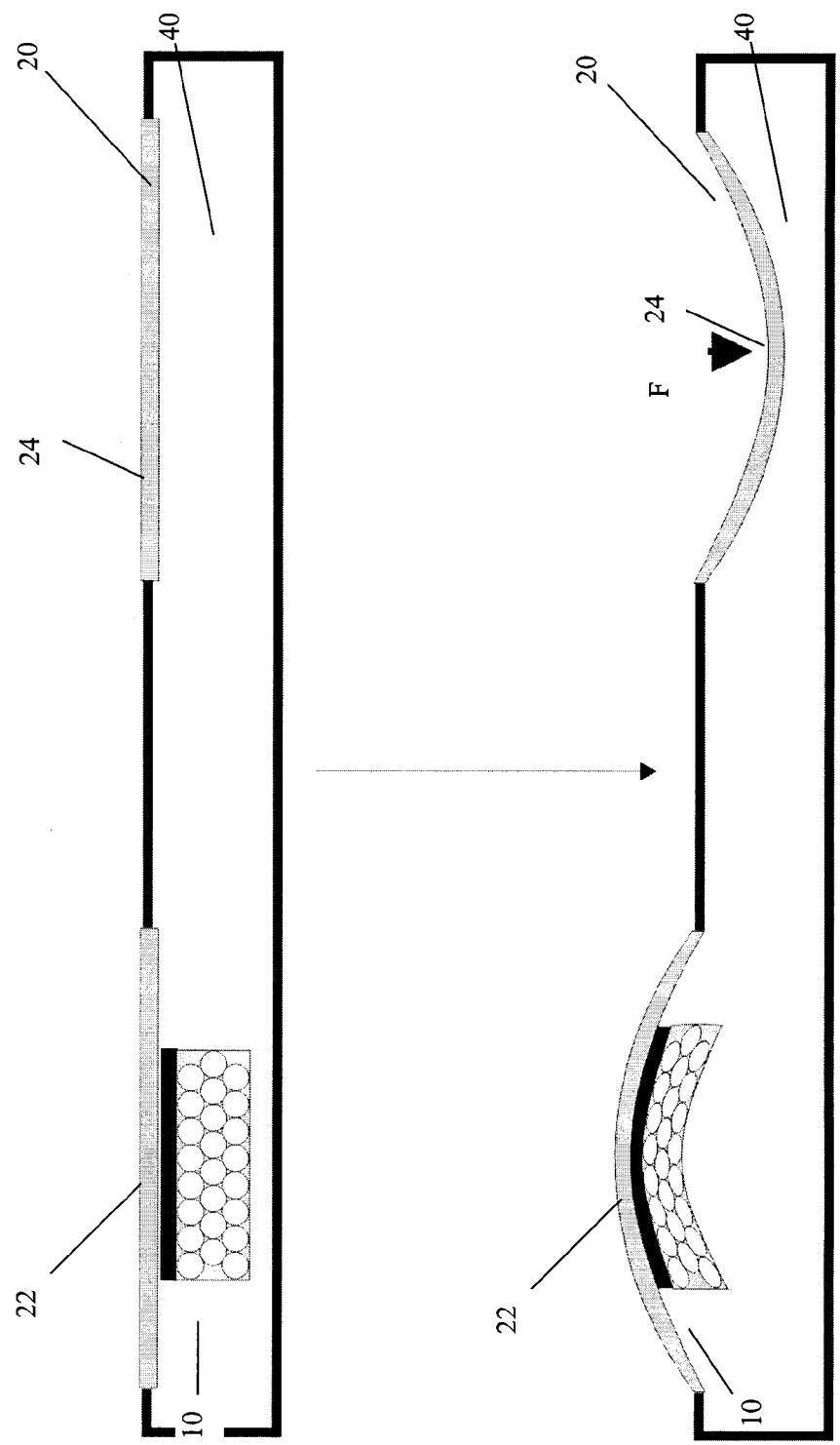
FIG. 5 illustrates an example device having activation via fluid transfer.

FIG. 5 shows an example device whereby the deformation of the photonic crystal material 10 may be mediated by fluid pressure. In this example, the fluid-filled chamber 40 may be similar to that described with respect to FIG. 2, above. In this example, the activation surface 20 may include portions having elastic membranes, in particular the activation portion 24 and the material-supporting portion 22 may include elastic membranes, which may form a part of the wall of the fluid-filled chamber 40. By compression of the fluid-filled chamber 40 at the activation portion 24, fluid may be displaced to the uncompressed regions of the fluid-filled chamber 40, increasing the fluid pressure in the uncompressed regions. This may cause the elastic membrane at the material-supporting portion 22 to balloon outwards and increase in lateral area, thereby stretching the photonic crystal material 10 laterally (where the lateral plane of the photonic crystal material 10 is defined as being parallel to the substrate 30 when the photonic crystal material 10 is unstretched) and causing a change in the lattice structure of the photonic crystal material 10 in at least the lateral direction. This may cause a contraction of the photonic crystal material 10 in a direction substantially or approximately perpendicular to the substrate 30, thus resulting in a change to the second reflectance spectrum (e.g., shift to shorter reflectance wavelengths) and a change in the overall optical effect of the device.

In some examples, the elastic membrane at the activation portion 24 and/or the material-supporting portion 22 may be made of any suitable elastomer or flexible polymer, including, for example: natural rubber, synthetic rubber, polyisoprene, polybutadiene, silicones, butyl rubber, halogenated butyl rubber, styrene-butadiene rubber, nitrile rubber, halogenated nitrile rubber, EPM rubber, EPDM rubber, epichlorohydrin rubber, polyacrylates, polyurethanes, fluoropolymers, fluoroelastomers, polyethers, block copolymers, poly ethylene-vinyl acetate, thermoplastic elastomers, biopolymers, or polysulfides.

Figure 6:
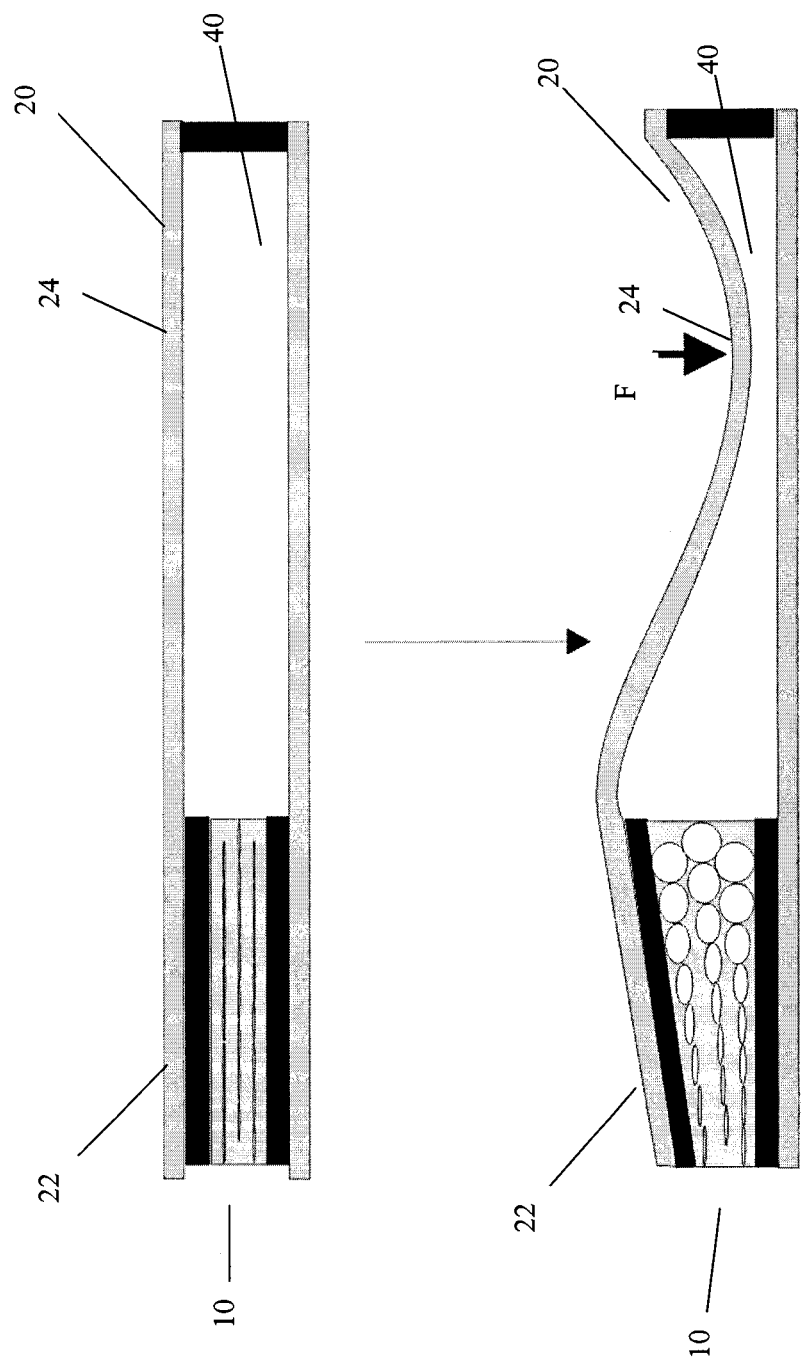
FIG. 6 illustrates another example device having activation via fluid transfer.

FIG. 6 shows example device whereby the deformation of the photonic crystal material 10 may be mediated by fluid pressure. In this example, the photonic crystal material 10 may comprise voids which are fully or partially collapsed in the unactivated state. In such an example, the unactivated state of the photonic crystal material 10 may have a first reflectance spectrum in which little or no light is reflected (e.g., the photonic crystal material 10 may appear to be transparent). The photonic crystal material 10 may be coupled to the activation surface 20 and the substrate 30, which bound a sealed or semi-sealed fluid-filled chamber 40. Application of a force F at the activation portion 24 may cause the fluid in the fluid-filled chamber 40 to be displaced to the uncompressed regions of the fluid-filled chamber 40. The change in fluid pressure may cause the voids of the photonic crystal material 10 to inflate (e.g., due to infiltration of the fluid into the voids), thereby increasing the lattice constant of the photonic crystal material 10 in at least one direction. This deformation of the photonic crystal material 10 may result in a change to the second reflectance spectrum (e.g., shift to longer reflectance wavelengths) and a change in the overall optical effect of the device.

In some examples, the photonic crystal material 10 may be designed have certain interactions with the fluid. For example, the photonic crystal material 10 may be designed to prevent or inhibit the fluid from infiltrating the photonic crystal material 10 in the absence of any applied force F. This may be achieved, for example, by suitably controlling the photonic crystal material 10 properties (e.g., hydrophobicity/hydrophilicity and/or solubility parameter) relative to the solvency of the fluid, and/or by providing suitable surface coatings (e.g., silane surface modifiers) on the photonic crystal material 10. For example, where the fluid is water, the photonic crystal material 10 may be designed to be hydrophobic, in order to prevent or inhibit infiltration of water unless a force F is applied. Such control and/or modification of the photonic crystal material 10 properties may be readily achieved during manufacturing or post-processing of the photonic crystal material 10 using suitable techniques and materials.

Figure 7:
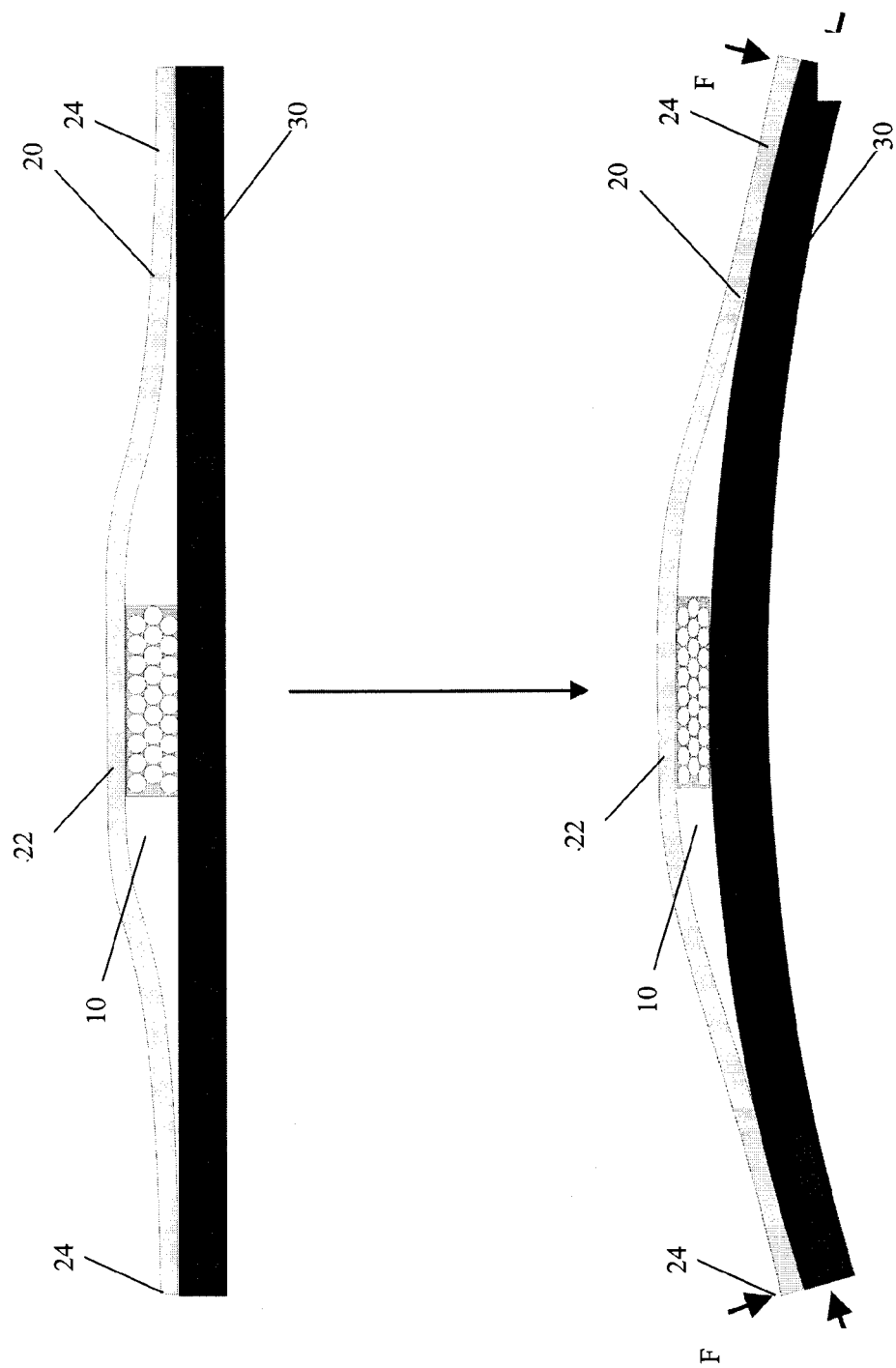
FIG. 7 illustrates an example device having activation by mechanical deformation.

FIG. 7 shows an example device whereby the deformation of the photonic crystal material 10 may be mediated by a mechanical deformation, such as a flexing stress between two or more activation portions 24. In this example, the photonic crystal material 10 may be coupled to the activation surface 20 and/or the substrate 30, or may be free-floating between the activation surface 20 and the substrate 30. The activation surface 20 and the substrate 30 may be in contact with each other (e.g., coupled to each other) in regions, including the activation portions 24, offset from the photonic crystal material 10 and may be spaced apart in region(s) where the photonic crystal material 10 is situated. By flexing the activation surface 20 or the substrate 30 or both, there may be a differential stress generated due to either of the activation surface 20 or the substrate 30 experiencing a greater bending stress than the other (e.g., due to a difference in rigidity and/or dimension). This stress may cause the activation surface 20 and the substrate 30 to be pulled closer together in the region (s) where the photonic crystal material 10 is situated, thereby compressing the photonic crystal material 10 and causing a change its lattice constant in at least one direction (e.g., decrease in lattice constant in a direction substantially or approximately perpendicular to the substrate 30, which may result in a shift to shorter reflectance wavelengths). This stress may also cause the activation surface 20 and the substrate 30 to be pushed further apart in the region(s) where the photonic crystal material 10 is situated, thereby expanding the photonic crystal material 10 and causing a change its lattice constant in at least one direction (e.g., increase in lattice constant in a direction substantially or approximately perpendicular to the substrate 30, which may result in a shift to longer reflectance wavelengths). This deformation of the photonic crystal material 10 may cause a change to the second reflectance spectrum and hence a change in the overall optical effect of the device.

Figure 9:
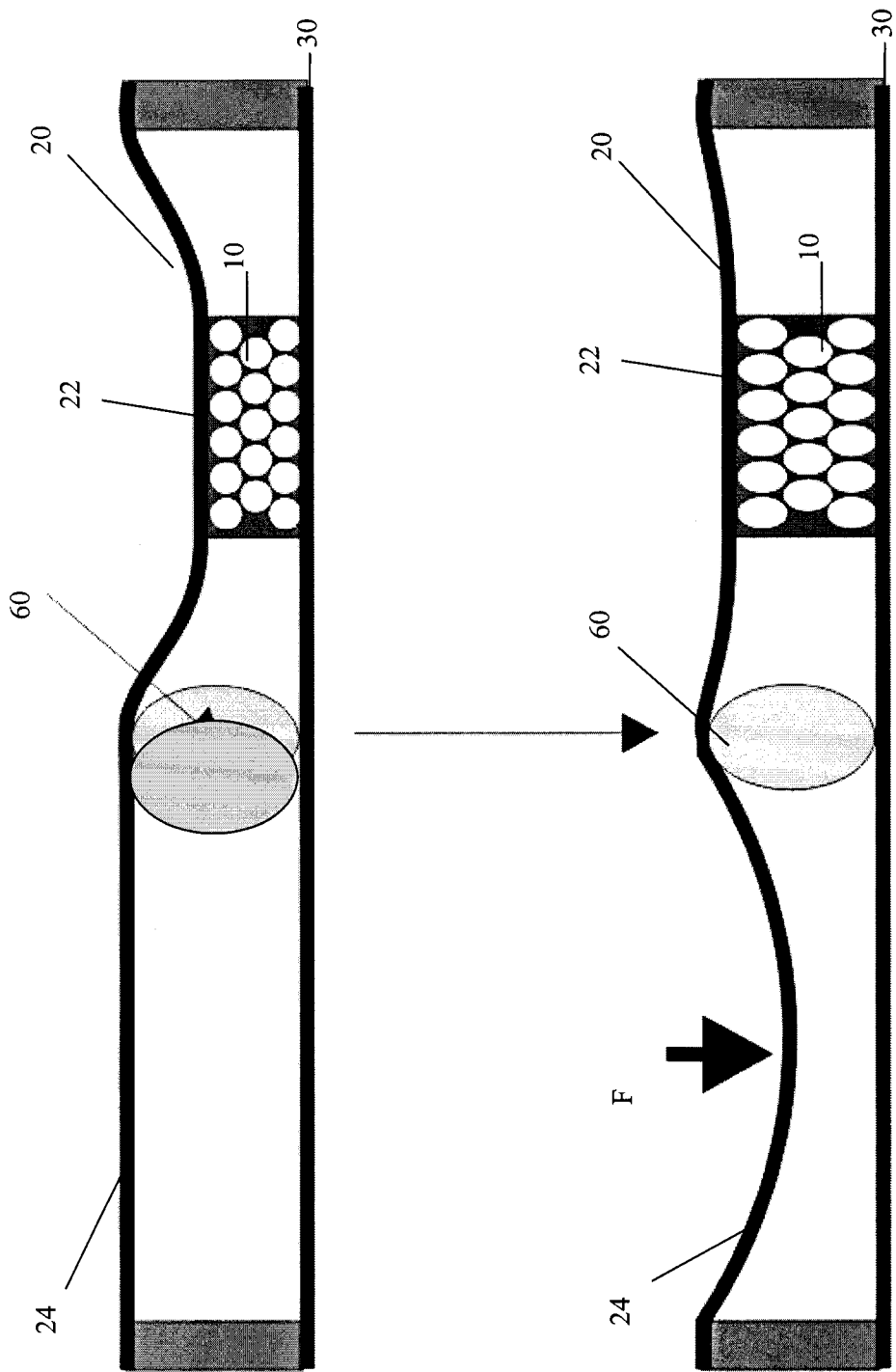
FIG. 9 illustrates an example device having activation via a wheel-and-pulley mechanism.

FIG. 9 shows an example photonic crystal device in which deformation of the photonic crystal material 10 may be effected by a pulley mechanism. In this example, the activation surface 20 may be substantially flexible (e.g., may be made of a relatively thin flexible polymer such as polyester, or polypropylene, which may have a thickness of a few millimeters down to about 10-100 micrometers or thinner) and may be supported by a wheel 60 or other support. In this example, the wheel 60 may be supported by the substrate 30, although in other examples the wheel 60 may be supported in other configurations or orientations. In some examples, the wheel 60 or other support may be rotatable (e.g., configured as a sphere or rod) to allow wheel 60 to roll and permit the activation surface 20 to translate over the wheel 60. In some examples, the wheel 60 or other support may not be rotatable and may include a relatively non-movable or fixed component, which may have sufficiently low adhesion to the activation surface 20 such that the activation surface 20 may substantially slide over the wheel 60. In the unactivated state, the activation surface 20 may be loose in the material-supporting portion 22 on one side of the wheel 60. Application of a force F on the activation surface 20 at the activation portion 24 on the other side of the wheel 60 may cause the material-supporting portion 22 to become more taut, thus pulling up on the photonic crystal material 10. Where the photonic crystal material 10 is also coupled to the substrate, this may cause the photonic crystal material 10 to stretch, changing the lattice of the material in at least one direction and causing a change in the overall optical effect of the device. Although a wheel 60 has been described, it should be understood that the support may have other configurations, for example a sphere or rod, or any other suitable configuration. The wheel 60 or other support may include an adhesive (e.g., a pressure-sensitive adhesive) on a surface that is in contact with the activation surface 20 and the substrate 30, such that coupling between the activation surface 20 and the substrate 30 is maintained.

Figure 10:
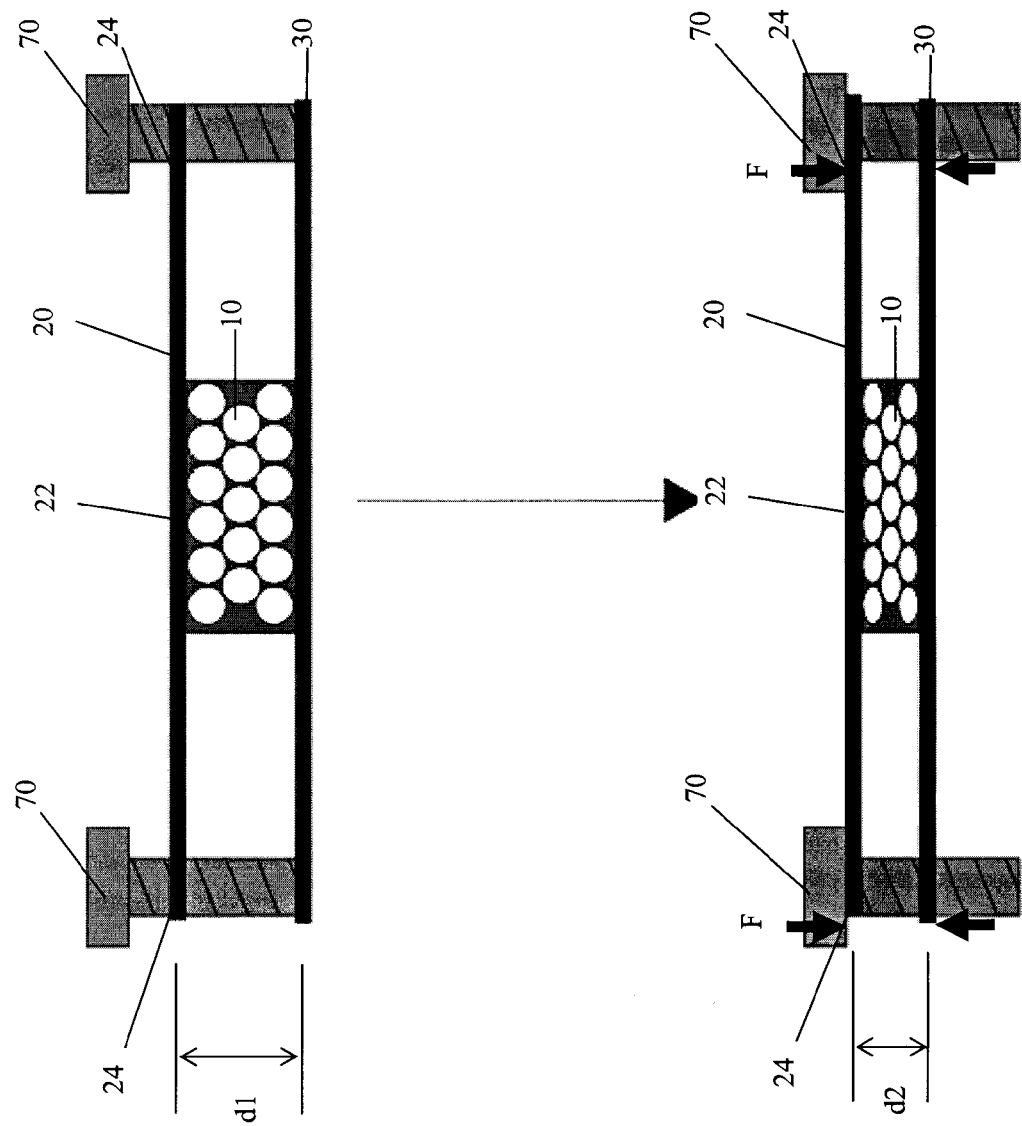
FIG. 10 illustrates an example device including two substantially rigid substrates.

FIG. 10 shows an example photonic crystal device in which deformation of the photonic crystal material 10 may be effected by offset compression. In this example, the photonic crystal material 10 is provided between the activation surface 20 and the substrate 30. In the unactivated state, the activation surface 20 and the substrate 30 may be kept at a first distance d1 apart, for example the activation surface 20 may be supported at a first distance d1 apart from the substrate 30 by one or more support members 70. The activation surface 20 and/or the substrate 30 may be moveable along the length of the support member(s) 70, such that they may be brought closer to each other by application of a force F at the activation portion 24, to a second distance d2 apart, thereby compressing the photonic crystal material 10 to its activated state. In the example of FIG. 10, there are fasteners (e.g., two screws) that serve as support members 70, and the activation surface 20 and the substrate 30 may be brought closer to each other by tightening the fasteners appropriately. The activation surface 20 and the substrate 30 may be brought closer together symmetrically or asymmetrically, for example.

In some examples, the support member(s) 70 may include a biasing member (e.g., a spring) on a post that biases the activation surface 20 and the substrate 30 at the first distance d1 apart. The activation surface 20 and/or the substrate 30 may be freely moveable along the post, such that they may be moved close to a second distance d2 apart by a force F, thereby compressing the photonic crystal material 10. When the force F is released, the biasing member may return the activation surface 20 and/or the substrate 30 to the first distance d1 apart, thereby returning the photonic crystal material 10 its unactivated state.

All devices described may incorporate data content arising from the change in optical effect due to activation of the photonic crystal material. The difference in optical effect (e.g., a visually detectable change) being generated by the offset activation may cause this data content to become more or less apparent, or may change its qualitative nature (e.g., change of color and/or transparency of the device). Data content that may be included in the device may include, for example, alpha-numeric characters, barcodes, indicia, graphics, logos, any other suitable optical content, and combinations thereof.

Figure 8:
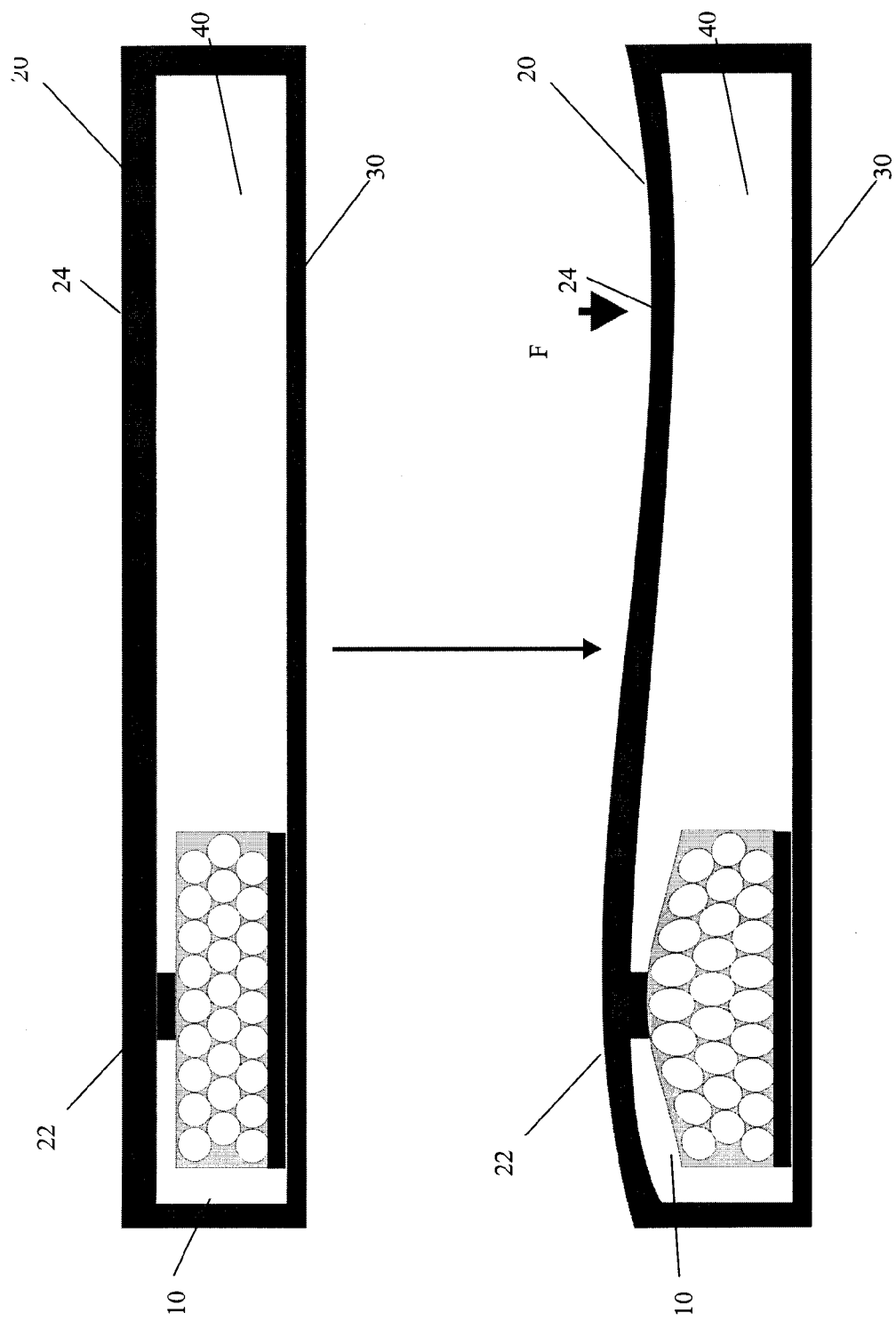
FIG. 8 illustrates an example device having by fluid transfer, where the activation is confined to predetermined areas.

FIG. 8 illustrates an example of how data content may be included in an example photonic crystal device. In this example, the device may operate similarly to the example device of FIG. 2. In the example of FIG. 8, only one or more portions of the photonic crystal material 10 may be coupled to the activation surface 20 at the material-supporting portion 22. This may result in activation being confined to the one or more predetermined areas corresponding to the one or more coupled portion(s), where the one or more predetermined areas represent the data content. When a force F is applied at the activation portion 22, fluid displacement in the fluid-filled chamber 40 causes expansion at the material-supporting portion 22. Only the portion(s) of the photonic crystal material 10 coupled to the activation surface 20 (and, in some cases, areas immediately surrounding the coupled portion(s)) is stretched, causing activation of only those portion(s) (and, in some cases, immediately surrounding areas, for example where the photonic crystal material 10 is sufficiently cross-linked to allow transfer of some stretching within the material 10) of the photonic crystal material 10. This may allow data content (e.g., pattern, alphanumeric characters, image, etc.) to be revealed.

In some examples, the device may also incorporate a background (e.g., provided on the substrate 30) and/or a foreground (e.g., provided on the activation surface 20), which may include data content, whose optical effect (e.g., visual appearance) may change (e.g., may change color, or may be concealed or revealed) when the device is activated.

The device may be designed to have various dimensions and configurations to suit the application. Although the examples described herein show the device as being relatively planar, it should be understood that the device may be non-planar. For example, the device may be relatively flexible and conformable to any surface geometry. The distance between the activation portion 24 and the material-supporting portion 22 may also be varied to suit the application. For example, where the activation portion 24 is desired to be a great distance from the material supporting portion 22 (e.g., several meters away or greater), a suitably rigid substrate 30 and/or activation surface 20 may be used or a suitable fluid for effective transfer of fluid pressure may be used.

In some examples, the device may be relatively thin, for example at most a few centimeters thick, such as less than 1 cm thick. The photonic crystal material 10 may be a thin film material, for example having a thickness of about 200 nm to 100 micrometers, such as about 1-50 micrometers. The substrate 30 and the activation surface 20 may each be about 6 micrometers thick (e.g., as in commercially available polymer substrates) or less, and may be as thick as several centimeters or more. The distance between the substrate 30 and the activation surface 20, for accommodating the fluid-filled chamber 40, may range from about 200 nm (e.g., about the thickness of the photonic crystal material 10) to several centimeters or more, such as about 1-2000 micrometers. It should be understood that the thickness of the components of the device and of the device itself may be varied to suit the application. For example, the device and/or its components may be thinner where greater flexibility is desired, and may be thicker where greater rigidity is desired. The dimensions of the photonic crystal material 10 may be chosen to obtain a desired optical effect, for example as described in PCT Publication No. WO2008/098339, and in PCT Publication No. WO2006/097173, which have been incorporated by reference in their entireties.

In some examples, The photonic crystal material 10 may have a lattice structure with a periodic modulation in its refractive index (e.g., due to differences in refractive indices of its constituents and/or due to differences in refractive indices between its constituent(s) and air-filled voids). Such periodic modulation, in one-, two- or three-dimensions, may result in an initial unactivated reflectance spectrum for the material 10. The wavelengths reflected in the reflectance spectrum may be dependent on, for example, the difference in refractive indices (also referred to as refractive index contrast), the thickness of the photonic crystal material 10, and/or the dimensions of the periodic modulation. For example, the wavelength of light that is reflected may be proportional to the periodicity of the modulation of refractive indices in the photonic crystal material 10. In some examples, the photonic crystal material 10 may be designed (e.g., by selecting the constituent(s) and/or dimension of periodicity) to have an initial reflectance spectrum in a desired wavelength range (e.g., a certain visible wavelength range, which may be observed as a certain initial color).

The photonic crystal material 10 may have an inverse opal structure, in which the photonic crystal material 10 may have an ordered three-dimensional periodic array of voids defined in a matrix (e.g., a polymer matrix). In such an example, the initial reflectance wavelength may arise due to the refractive index contrast (RIC) between the matrix constituent(s) and air in the voids.

Any suitable photonic crystal material 10 may be used in the disclosed devices. For example, some photonic crystal materials 10 may have open porosity, such that they are comprised of one or more constituents permeated with voids. These voids may themselves be ordered, or may be distributed in a disordered fashion throughout one or more of the constituents. Such voids may be infiltrated by a fluid (e.g., where the device includes a fluid-filled chamber 40) that may affect the optical behavior of the photonic crystal material 10. Alternatively, such voids may be protected from infiltration (e.g., by a non-permeable membrane). In some examples, photonic crystal materials 10 that are non-porous may also be responsive to deformation stress, as in the example described in WO2006097173 (A1).

In some examples, where the photonic crystal material 10 includes a polymer matrix, the photonic crystal material 10 may include one or more of: polystyrenes, polymethacrylates, polyacrylates, polyurethanes, polyesters, polyethylenes, polypropylenes, polyamides, polyimides, polycarbonates, fluoropolymers, polyvinylchlorides, polyisoprene, polybutadiene, polydienes, polyolefins, polyethers, polyvinyl acetals, polyvinyl esters, polyvinyl ethers, polyvinyl ketones, polyvinylpyridines, polyvinylpyrrolidones, polyamines, polycations, polyanions, ionomers, polyvinyl alcohols, polyvinyl acids, silicones, epoxy resins, waxes, polysaccharides, cellulosic polymers, polylactides, biopolymers, biodegradable polymers, conducting polymers, redox-polymers, polymers containing metal atoms, and copolymers or combinations thereof. In some examples, the polymer may be a cross-linked polymer network, for example, to form a polymer matrix. Other conventional polymers may be suitable, including monomers, crosslinkers, polymerization initiators, or other polymer precursors described on the Aldrich Polymer Science page (http://www.sigmaaldrich.com/materials-science/polymer-science.html), or provided by industrial suppliers such as Sartomer.

In some examples, the polymer matrix may be an elastomer, which may be a cross-linked polymer network. In some examples, the cross-linked polymer network may include cross-linked polymethacrylate and/or cross-linked polyacrylate polymers. The polymer matrix may be formed from a monomer or pre-polyer, for example one or more of: methacrylic acid esters, acrylic acid esters, polyisoprene, polybutadiene, polyurethane precursors, crosslinkable polyethers, and mixtures thereof. In some examples, the methacrylic acid ester may be one or more of: ethylhexyl methacrylate, lauryl methacrylate, butyl methacrylate, methyl methacrylate, stearyl methacrylate, butoxyethyl methacrylate, and mixtures thereof. In some examples, the acrylic acid ester may be one or more of: butoxyethyl acrylate, hydroxyethyl acrylate, 2-carboxyethyl acrylate, stearyl acrylate, lauryl acrylate, butyl acrylate, hexyl acrylate, and mixtures thereof. In some examples, the crosslinkable polyether may be one or more of: polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof.

In some examples, the polymer matrix may be formed from a monomer or pre-polymer selected from one or more of: methacrylic acid esters, acrylic acid esters, polyisoprene, polybutadiene, polyurethane precursors, polyolefin precursors, polyethers, and mixtures thereof. In some examples, the polymer matrix may be formed from the polymerization of monofunctional acrylic acid esters or multifunctional acrylic acid esters. In some examples, the monofunctional acrylic acid ester may be one or more of: butoxyethyl acrylate, hydroxyethyl acrylate, 2-carboxyethyl acrylate, poly(2-carboxyethyl) acrylate, stearyl acrylate, lauryl acrylate, butyl acrylate, hexyl acrylate, 2-phenoxyethyl acrylate and mixtures thereof. In some examples, the multifunctional acrylic acid ester may be one or more of: diacrylates, triacrylates, polyacrylates, and mixtures thereof. In some examples, the diacrylate may be one or more of: ethylene glycol diacrylate, poly(ethylene glycol) diacrylates, neopentyl glycol diacrylate, neopentyl glycol propoxylate (1 PO/OH) diacrylate, and mixtures thereof.

In some examples, the polymer matrix may be formed through the action of a polymerization initiator. This polymerization initiator may be a free radical initiator which may polymerize vinyl, acrylate, or methacrylate functional monomers. The polymerization initiator may be a cationic initiator, which may, for example, polymerize epoxide and vinyl ether functional monomers. The initiator(s) may be activated by UV light (e.g., including a photoinitiator), or may be activated by heat (e.g., including a thermal initiator).

In some examples, the photonic crystal material 10 may have a one-dimensional periodicity, for example having a Bragg stack structure. In such examples, the photonic crystal material 10 may having alternating layers of constituents having a refractive index contrast. One or more of these layers may include a deformable component.

One or more layers may be comprised of nanoparticles or microparticles, for example one or more of: metal nanoparticles, polymer nanoparticles, inorganic nanoparticles, semiconductor nanoparticles, silica, titanium oxide, polymers, graphite, diamond, amorphous forms of carbon, $C_{60}$, fullerenes, graphenes, carbon nanotubes, silicon, silicon carbide, germanium, simple and complex binary and ternary metal oxides, metal chalcogenides, metal borides, metal phosphides, metal silicides, metal carbides, metal nitrides, iron oxides, tin oxides, antimony doped tin oxides, zinc oxides, and combinations thereof. In some examples, one or more layers may be made of a polymer material, for example one or more of: polystyrenes, polymethacrylates, polyacrylates, polyurethanes, polyesters, polyethylenes, polypropylenes, polyamides, polyimides, polycarbonates, fluoropolymers, polyvinylchlorides, polyisoprene, polybutadiene, polydienes, polyolefins, polyethers, polyvinyl acetals, polyvinyl esters, polyvinyl ethers, polyvinyl ketones, polyvinylpyridines, polyvinylpyrrolidones, polyamines, polycations, polyanions, ionomers, polyvinyl alcohols, polyvinyl acids, silicones, epoxy resins, waxes, polysaccharides, cellulosic polymers, polylactides, biopolymers, biodegradable polymers, conducting polymers, redox-polymers, polymers containing metal atoms, and copolymers or combinations thereof. The polymer may be a cross-linked polymer network, for example, to form a polymer matrix. Other conventional polymers may be suitable, including monomers, crosslinkers, polymerization initiators, or other polymer precursors described on the Aldrich Polymer Science page (http://www.sigmaaldrich.com/materials-science/polymer-science.html), or provided by industrial suppliers such as Sartomer.

The material used for the activation surface 20 and/or the substrate 30 may depend on how the force F is to be transferred. For example, in the example devices of FIGS. 3 and 10, it may be desirable for the activation surface 20 and the substrate 30 to be relatively rigid, while in the example devices of FIGS. 2-9, it may be desirable for at least one of the activation surface 20 and the substrate 30 to be relatively flexible.

Suitable materials for the activation surface 20 and/or the substrate 30 may include, for example, plastic foil, film, membrane or sheet (including, for example, reinforced or composite plastics or porous plastics); metal foil, film or sheet; glass, paper, cardboard or other non-woven fibrous materials; natural or synthetic fabrics; ceramics, cermets or other ceramic composites; or any other suitable material, depending on the desired rigidity or flexibility.

Suitable materials for the fluid of the fluid-filled chamber 40 may include, for example, any suitable gasses (e.g., air, nitrogen, noble gases, carbon dioxide, etc.), liquids (e.g., water, oils, organic or inorganic solvents, etc.), gels, pastes (e.g., modeling clay), polymers below the glass transition point (e.g., components of a pressure-sensitive adhesive), rubbers (e.g., soft rubbers that can be deformed), or any other suitable material. In some examples, the fluid-filled chamber 40 may in fact contain non-fluid materials. For example, solid pellets or particles suspended in a gel may be used.

The fluid-filled chamber may include a single cavity, or may include two or more cavities in fluid communication. The fluid paths between two or more cavities may be used to modulate the response of the device, or the pressure distribution between cavities in the fluid-filled chamber. For example, a fluid path between two cavities might include a valve, which might prevent or inhibit one-way or two-way fluid flow, in order to slow down activation and/or slow down reversal of the optical change once the activation force is removed. This valve may be user-activated, such that some action by the user (e.g., pressure on a designed valve-opening portion of the device) may open the valve and allow the photonic crystal material to revert to its original state, thereby resetting the device to its unactivated state.

In some examples, the changed optical characteristics of the device (e.g., visual appearance) when activated may be permanent or temporary (e.g., fully or partially reversible). Where the change is permanent, the device may be suitable for one-time-use applications (e.g., for tamper-proof seals).

In some examples, reversal of the device to the unactivated state may be full, in which the photonic crystal material returns from the second reflectance spectrum in its activated state back to the first reflectance spectrum of its unactivated state. In other examples, reversal of the device to the unactivated state may be partial, in which the photonic crystal material returns from the second reflectance spectrum in its activated state to a third reflectance spectrum that is intermediate to the first and second reflectance spectrum (e.g., where the structure of the photonic crystal material does not entirely recover its unactivated dimensions).

The device may incorporated in various devices. For example, the device may be provided on a card (e.g., a thin film of photonic crystal material may be sandwiched between the core layer and top-laminate of a plastic card). The disclosed device may be useful in the field of anti-counterfeit security features. For example, the material may be useful in the fields of: a) documents of value, including legal tender, bills of exchange, money orders, share certificates, bonds, stamps, tax stamps/bands, land titles; b) cards and identification, including passports, birth certificates, drivers licenses, visa documents, health cards, social security cards, national identity cards, work permits, citizenship documents, alien registration documents, credit cards, debit cards, gift cards, access passes, membership cards; and c) product packaging and tagging, including that for over-the-counter and prescription drugs, medicines and pharmaceuticals, vaccines, vitamins, nutritional supplements, herbal formulations, herbicides, pesticides, apparel, accessories, watches, clothes, shoes, handbags, cosmetics, toys, jewelry, gems, precious metals, compact disks, videotapes, DVDs, computer software, video games, other media, technology products, batteries, airline parts, auto parts, small arms, wine, spirits, beer, cigarettes, cigars, books, sports equipment and memorabilia, collectibles, antiques, cups, diapers, tape, saran wrap, adhesives, bandages, gloves; and other such authentication applications.

In some examples, the device may be useful in the field of anti-counterfeit security features, tamper-proof packaging, tracking devices in manufacturing, processing, and product distribution, among others. For example, the device may be useful for a re-usable or one-time-use security device, safety seal, or tamper-evident label, among other possibilities.

In some examples, the device may be useful as pressure indicators in a variety of products. For instance, an example device may be incorporated into active-wear such as running shoes. The example device may include a fluid-filled chamber with one cavity on the sole of the shoe and one cavity on the top of the shoe, with the photonic crystal material being provided in the cavity on the top of the shoe, such that stepping or jumping with the shoe causes transfer of fluid pressure be transferred from the compressed cavity on the sole into the uncompressed cavity on the top of the shoe, thereby stretching the photonic crystal material. This may result in a change in optical appearance of the device. The extent of the change may be related to the force of the step or jump. In some examples, the device may include a valve between the two cavities to allow the user to visualize the activated color prior to automatically or manually resetting the device to regenerate the unactivated optical effect. A similar application may be for use in sports equipment subject to a compressive force (e.g., boxing gloves, baseball bat, golf club, etc.) to indicate the force and/or location of an impact.

FIG. 11 shows images of an example photonic crystal device in operation. FIG. 11 illustrates the operation of an example device similar to that of FIG. 4. In the example of FIG. 11, the compressible photonic crystal material was coupled (e.g., with an adhesive such as a two-part clear epoxy resin) to the substrate (in this example, 1 mm thick glass), then coupled (e.g., with an adhesive) to the activation surface (in this example, 0.1 mm thick mylar). The adhesive was then allowed to cure. In this example, the device includes a film of photonic crystal material approximately 1 cm×1 cm in size. The device in total measured a about 5 cm×5 cm in size. The substrate was about 100 micrometer thick, the photonic crystal material including adhesive was about 50 micrometers thick, the activation surface was about 100 micrometer, and the device in total was about 250 micrometers thick. The photonic crystal material in this example was manufactured as described in PCT Publication No. WO2008/098339, which has been previously incorporated by reference in its entirety. The left image shows the unactivated device, which has a uniform green appearance. In the right image, the device is activated by applying the force F (in this case using a finger) at a portion offset to the right from the photonic crystal material. When activated, the device exhibits a change in optical effect by revealing the black background of the substrate (white arrow) through one portion of the photonic crystal material, while another portion (black arrow) exhibits a color change from green to red. This optical effect is the result of one portion (white arrow) of the photonic crystal material being compressed, causing a blue-shift in the reflectance spectrum to ultraviolet wavelengths (and rendering it transparent to human vision), the compressed portion then serves as a hinge or pivot, causing another portion (black arrow) to be stretched and resulting in a red-shift in the reflectance spectrum to red wavelengths.

FIG. 12 shows images of another example photonic crystal device in operation. FIG. 12 illustrates the operation of an example device similar to that of FIG. 2. In the example of FIG. 12, the compressible photonic crystal material was adhered to a substrate (in this case, electrical tape). A spacer was made with three layers of electrical tape having a peanut-shaped cutout and applied to the substrate. The activation surface (in this case, a polyester material with a localized layer of pressure-sensitive adhesive, such as scotch tape) was applied on the spacer and adhered to a portion of the photonic crystal material (in this case, the left portion of the peanut-shaped cutout). The substrate, spacer and activation surface together defined the fluid-filled chamber (in this case, filled with air). The photonic crystal material was adhered to the activation surface by the localized adhesive. In this device, the fluid-filled chamber measured approximately 2.5 cm×1 cm, with a distance between the substrate and the activation surface of around 200 micrometers. The device in total measured about 5 cm×5 cm in size. The substrate was about 100 micrometers thick, the activation surface was about 100 micrometers thick, the distance between the substrate and the activation surface was about 100 micrometers, the photonic crystal material was about 50 micrometers thick and the device in total was about 300 micrometers thick. The photonic crystal material in this example was manufactured as described in PCT Publication No. WO2008/098339, which has been previously incorporated by reference in its entirety. The left image shows the unactivated device, which has a uniform blue appearance through the cutout. In the right image, the device is activated by application of a force F (in this case using a finger) on the right portion of the activation surface, which is not coupled to the photonic crystal material. This causes the fluid in the fluid-filled chamber to move to the left portion, causing the activation surface and the substrate to be pushed apart, thereby stretching the photonic crystal material. This causes a red-shift of the reflectance spectrum of the photonic crystal material, in this case resulting in the device changing from an initial blue color to a green color (white arrow) at the left portion of the device.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A photonic crystal device comprising:
 a photonic crystal material exhibiting a first reflectance spectrum in an unactivated state, the photonic crystal material having an activated state in response to at least mechanical stimulation and exhibiting a second reflectance spectrum different from the first reflectance spectrum in the activated state;
 an activation surface having a material-supporting portion directly coupled to at least a portion of the photonic crystal material; and
 an activation portion defined on the activation surface offset from the material-supporting portion;
 wherein application of a force at the activation portion causes a deformation of the photonic crystal material sufficient to bring the photonic crystal material to the activated state.

2. The photonic crystal device of claim 1 wherein the photonic crystal material is provided on a substrate.

3. The photonic crystal device of claim 2 wherein the substrate is coupled to the activation surface via a pivot, and wherein the activation surface is sufficiently rigid to transfer force applied at the activation portion to the photonic crystal material by way of a lever mechanism.

4. The photonic crystal device of claim 3 wherein the activation portion and the material-supporting portion are on either sides of the pivot, forming a class one lever.

5. The photonic crystal device of claim 3 wherein the activation portion and the material-supporting portion are both on one side of the pivot, the activation portion being farther from the pivot than the material-supporting portion, forming a class two lever.

6. The photonic crystal device of claim 3 wherein the activation portion and the material-supporting portion are both on one side of the pivot, the activation portion being closer to the pivot than the material-supporting portion, forming a class three lever.

7. The photonic crystal device of claim 3 wherein the pivot is provided by a portion of the photonic crystal material that is less deformable than at least one other portion of the photonic crystal material.

8. The photonic crystal device of claim 1 wherein the device comprises a fluid-filled chamber, the activation surface being provided on at least one outer surface of the fluid-filled chamber, wherein deformation of the activation portion causes a corresponding deformation of the material-supporting portion.

9. The photonic crystal device of claim 8 wherein the deformation of the activation portion causes a transfer of fluid to cause the corresponding deformation of the material-supporting portion.

10. The photonic crystal device of claim 8 wherein the fluid is a gas, a vapor, a liquid or a semi-liquid.

11. The photonic crystal device of claim 8 herein the fluid-filled chamber comprises a valve for mediating transfer of fluid in the fluid-filled chamber.

12. The photonic crystal device of claim 11 wherein the fluid-filled chamber comprises at least two cavities in fluid communication with each other, wherein the valve is provided in a fluid path between at least two of the at least two cavities to mediate transfer of fluid between the at least two of the at least two cavities.

13. The photonic crystal device of claim 1 wherein the photonic crystal material is provided on a substrate, in a space defined between the substrate and the activation surface, and wherein application of the force at the activation portion decreases the space, thereby causing deformation of the photonic crystal material.

14. The photonic crystal device of claim 13 wherein the activation surface and the substrate are biased apart in the unactivated state.

15. The photonic crystal device of claim 1 wherein the force is a compression force or a bending force.

16. The photonic crystal device of claim 1 wherein only a portion of the photonic crystal material immediately surrounding the portion directly coupled to the activation surface at the material-supporting portion is deformed.

17. The photonic crystal device of claim 16 wherein the portion immediately surrounding the directly coupled portion of the photonic crystal material corresponds to data content.

18. The photonic crystal device of claim 1 wherein the deformation of the photonic crystal material is unequal over the photonic crystal material.

19. The photonic crystal device of claim 1 wherein the photonic crystal material may be provided on a substrate and the substrate may be coupled to the activation surface via a support, wherein the activation surface is supported by and translatable over the support, the activation portion and the material-supporting portion being defined on opposing sides of the support, wherein application of the force at the activation portion, causes the material-supporting portion to become taut and deform the photonic crystal material.

* * * * *